United States Patent
Neels et al.

(10) Patent No.: US 8,994,660 B2
(45) Date of Patent: Mar. 31, 2015

(54) TEXT CORRECTION PROCESSING

(75) Inventors: Alice E. Neels, San Francisco, CA (US); Nicholas K. Jong, Campbell, CA (US)

(73) Assignee: Apple Inc., Cupertino, CA (US)

( * ) Notice: Subject to any disclaimer, the term of this patent is extended or adjusted under 35 U.S.C. 154(b) by 744 days.

(21) Appl. No.: 13/220,202

(22) Filed: Aug. 29, 2011

(65) Prior Publication Data

US 2013/0050089 A1    Feb. 28, 2013

(51) Int. Cl.
| | |
|---|---|
| *G09G 5/00* | (2006.01) |
| *G06F 3/041* | (2006.01) |
| *G06F 3/0488* | (2013.01) |
| *G06F 3/023* | (2006.01) |

(52) U.S. Cl.
CPC .......... *G06F 3/04886* (2013.01); *G06F 3/0237* (2013.01)
USPC ............ 345/162; 345/168; 345/169; 345/173

(58) Field of Classification Search
USPC .............. 345/156, 168, 169, 171–178; 704/1, 704/8–10; 715/257–261
See application file for complete search history.

(56) References Cited

U.S. PATENT DOCUMENTS

| | | | |
|---|---|---|---|
| 5,253,325 A | 10/1993 | Clark | |
| 5,305,205 A | 4/1994 | Weber et al. | |
| 5,581,484 A | 12/1996 | Prince | |
| 5,615,378 A | 3/1997 | Nishino et al. | |
| 5,736,974 A | 4/1998 | Selker | |
| 5,748,512 A | 5/1998 | Vargas | |
| 5,758,314 A | 5/1998 | McKenna | |
| 5,765,168 A | 6/1998 | Burrows | |
| 5,774,834 A | 6/1998 | Visser | |
| 5,778,405 A | 7/1998 | Ogawa | |
| 5,797,008 A | 8/1998 | Burrows | |
| 5,818,451 A | 10/1998 | Bertram et al. | |
| 5,896,321 A | 4/1999 | Miller et al. | |
| 5,943,443 A | 8/1999 | Itonori et al. | |
| 5,953,541 A | 9/1999 | King et al. | |

(Continued)

FOREIGN PATENT DOCUMENTS

| | | |
|---|---|---|
| WO | WO 98/33111 | 7/1998 |
| WO | WO 00/38041 | 6/2000 |
| WO | WO 2005/008899 | 1/2005 |

OTHER PUBLICATIONS

CALL Centre 1999, "Word Prediction," Copyright (c) The CALL Centre & Scottish Executive Education Dept., pp. 63-73.

(Continued)

*Primary Examiner* — Kent Chang
*Assistant Examiner* — Nelson Rosario
(74) *Attorney, Agent, or Firm* — Morrison & Foerster LLP

(57) ABSTRACT

Text correction processing is disclosed. An initial score is assigned to each of a plurality of candidate sequences of one or more characters, based at least in part on a keyboard geometry-based value associated with the received user input with respect to the candidate key. Further processing is performed with respect to a subset of the candidate sequences having the highest initial score(s) to determine for each candidate sequence in the subset a refined score. A candidate sequence is selected for inclusion in a result set based at least in part on a determination that a refined score of the selected candidate is higher than an initial score of one or more candidate sequences that are not included in the subset and with respect to which the further processing has not been performed.

25 Claims, 11 Drawing Sheets

(56) References Cited

U.S. PATENT DOCUMENTS

| | | |
|---|---|---|
| 6,023,536 A | 2/2000 | Visser |
| 6,040,824 A | 3/2000 | Maekawa et al. |
| 6,073,036 A | 6/2000 | Heikkinen et al. |
| 6,169,538 B1 | 1/2001 | Nowlan et al. |
| 6,259,436 B1 | 7/2001 | Moon et al. |
| 6,271,835 B1 | 8/2001 | Hoeksma |
| 6,298,321 B1 | 10/2001 | Karlov et al. |
| 6,307,548 B1 | 10/2001 | Flinchem et al. |
| 6,469,722 B1 | 10/2002 | Kinoe et al. |
| 6,470,347 B1 | 10/2002 | Gillam |
| 6,597,345 B2 | 7/2003 | Hirshberg |
| 6,671,856 B1 | 12/2003 | Gillam |
| 6,675,169 B1 | 1/2004 | Bennett et al. |
| 6,714,221 B1 | 3/2004 | Christie et al. |
| 6,795,059 B2 | 9/2004 | Endo |
| 6,803,905 B1 | 10/2004 | Capps et al. |
| 6,804,677 B2 | 10/2004 | Shadmon et al. |
| 6,857,800 B2 | 2/2005 | Zhang et al. |
| 7,038,659 B2 | 5/2006 | Rajkowski |
| 7,057,607 B2 | 6/2006 | Mayoraz et al. |
| 7,194,699 B2 | 3/2007 | Thomson et al. |
| 7,277,088 B2 | 10/2007 | Robinson et al. |
| 7,283,072 B1 | 10/2007 | Plachta et al. |
| 7,319,957 B2 * | 1/2008 | Robinson et al. ............ 704/252 |
| 7,443,316 B2 | 10/2008 | Lim |
| 7,475,063 B2 | 1/2009 | Datta et al. |
| 7,477,240 B2 | 1/2009 | Yanagisawa |
| 7,490,034 B2 | 2/2009 | Finnigan et al. |
| 7,508,324 B2 | 3/2009 | Suraqui |
| 7,526,738 B2 | 4/2009 | Ording et al. |
| 7,565,380 B1 | 7/2009 | Venkatachary |
| 7,584,093 B2 | 9/2009 | Potter et al. |
| 7,609,179 B2 | 10/2009 | Diaz-Gutierrez et al. |
| 7,679,534 B2 | 3/2010 | Kay et al. |
| 7,683,886 B2 | 3/2010 | Willey |
| 7,707,026 B2 | 4/2010 | Liu |
| 7,712,053 B2 | 5/2010 | Bradford et al. |
| 7,725,838 B2 | 5/2010 | Williams |
| 7,797,269 B2 | 9/2010 | Rieman et al. |
| 7,809,744 B2 | 10/2010 | Nevidomski et al. |
| 7,880,730 B2 | 2/2011 | Robinson et al. |
| 8,037,034 B2 | 10/2011 | Plachta et al. |
| 8,041,557 B2 | 10/2011 | Liu |
| 8,090,571 B2 | 1/2012 | Elshishiny et al. |
| 2002/0010726 A1 | 1/2002 | Rogson |
| 2002/0015064 A1 | 2/2002 | Robotham et al. |
| 2002/0085037 A1 | 7/2002 | Leavitt et al. |
| 2002/0126097 A1 | 9/2002 | Savolainen |
| 2002/0140679 A1 | 10/2002 | Wen |
| 2002/0191029 A1 | 12/2002 | Gillespie et al. |
| 2003/0090467 A1 | 5/2003 | Hohl et al. |
| 2003/0149978 A1 | 8/2003 | Plotnick |
| 2003/0193481 A1 | 10/2003 | Sokolsky |
| 2003/0197736 A1 | 10/2003 | Murphy |
| 2003/0204392 A1 | 10/2003 | Finnigan et al. |
| 2004/0070567 A1 | 4/2004 | Longe et al. |
| 2004/0135774 A1 | 7/2004 | La Monica |
| 2004/0160419 A1 | 8/2004 | Padgitt |
| 2004/0178994 A1 | 9/2004 | Kairls, Jr. |
| 2004/0183833 A1 | 9/2004 | Chua |
| 2004/0196256 A1 | 10/2004 | Wobbrock et al. |
| 2005/0024341 A1 | 2/2005 | Gillespie et al. |
| 2005/0099398 A1 | 5/2005 | Garside et al. |
| 2005/0162395 A1 | 7/2005 | Unruh |
| 2005/0190970 A1 | 9/2005 | Griffin |
| 2005/0216331 A1 | 9/2005 | Ahrens et al. |
| 2005/0246365 A1 | 11/2005 | Lowles et al. |
| 2005/0278647 A1 | 12/2005 | Leavitt et al. |
| 2005/0283726 A1 | 12/2005 | Lunati |
| 2006/0004744 A1 | 1/2006 | Nevidomski et al. |
| 2006/0152496 A1 | 7/2006 | Knaven |
| 2006/0206454 A1 | 9/2006 | Forstall et al. |
| 2006/0246955 A1 | 11/2006 | Nirhamo et al. |
| 2006/0265208 A1 | 11/2006 | Assadollahi |
| 2006/0265648 A1 | 11/2006 | Rainisto et al. |
| 2006/0274051 A1 | 12/2006 | Longe et al. |
| 2006/0293880 A1 | 12/2006 | Elshishiny et al. |
| 2007/0040813 A1 | 2/2007 | Kushler et al. |
| 2007/0046641 A1 | 3/2007 | Lim |
| 2007/0061754 A1 | 3/2007 | Ardhanari et al. |
| 2007/0067272 A1 | 3/2007 | Flynt et al. |
| 2007/0130128 A1 | 6/2007 | Garg et al. |
| 2007/0152978 A1 | 7/2007 | Kocienda et al. |
| 2007/0198566 A1 | 8/2007 | Sustik |
| 2007/0229323 A1 | 10/2007 | Plachta et al. |
| 2007/0260595 A1 | 11/2007 | Beatty et al. |
| 2007/0285958 A1 | 12/2007 | Platchta et al. |
| 2007/0288449 A1 | 12/2007 | Datta et al. |
| 2008/0059876 A1 | 3/2008 | Hantler et al. |
| 2008/0167858 A1 | 7/2008 | Christie et al. |
| 2008/0168366 A1 | 7/2008 | Kocienda et al. |
| 2008/0259022 A1 | 10/2008 | Mansfield et al. |
| 2009/0174667 A1 * | 7/2009 | Kocienda et al. ............. 345/169 |
| 2009/0249198 A1 | 10/2009 | Davis et al. |
| 2009/0327977 A1 | 12/2009 | Bachfischer et al. |
| 2010/0023318 A1 | 1/2010 | Lemoine |
| 2010/0036655 A1 * | 2/2010 | Cecil et al. ...................... 704/10 |
| 2010/0325588 A1 | 12/2010 | Reddy et al. |

OTHER PUBLICATIONS

Dyslexic.com, "AiphaSmart 3000 with CoWriter SmartApplet: Don Johnston Special Needs," http://www.dyslexic.com/procuts. php?catid=2&pid=465&PHPSESSID=2511b800000f7da . . . , downloaded Dec. 6, 2005, 13 pages.

Glossary of Adaptive Technologies: Word Prediction, http://www/utoronto.ca/atrc/reference/techwordpred.html, printed Dec. 6, 2005, 5 pages.

MacTech, "Keystrokes 3.5 for Mac OS X Boosts Word Prediction," http://www.mactech.com/news/?p=1007129, printed Jan. 7, 2008, 3 pages.

Masui, T., "PO Box: An Efficient Text Input Method for Handheld and Ubiquitous Computers," Proceedings of the International Symposium on Handheld and Ubiquitous Computers (HUC'99), Sep. 1999, 12 pages.

Mobile Tech News, "T9 Text Input Software Updated," htpp://www.mobiletechnews.com/info/2004/11/23/122155.html, Nov. 23, 2004, 4 pages.

NCIP: Word Prediction Collection, "What is Word Prediction?" http;//www2.edc.org/NCIP/library/wp/What_is.htm, printed Jan. 7, 2008, 2 pages.

NCIP: Word Prediction Collection, NCIP Library: Word Prediction Collection, http://www2.edc.org/NCIP/library/wp/toc.htm, printed Jan. 7, 2008, 4 pages.

International Search Report and Written Opinion dated May 8, 2008, received in International Application PCT/US2007/088872, which corresponds to U.S. Appl. No. 11/620,641, 12 pages (Christie).

International Search Report and Written Opinion dated May 8, 2008, received in International Application PCT/US2007/088873, which corresponds to U.S. Appl. No. 11/620,642, 11 pages (Kocienda).

Notice of Allowance dated Mar. 18, 2011, received in U.S. Appl. No. 11/640,641, 14 pages (Christie).

Office Action dated Mar. 30, 2010, received in U.S. Appl. No. 11/620,642, 13 pages (Kocienda).

Final Office Action dated Nov. 29, 2010, received in U S. Appl. No. 11/620,642, 16 pages (Kocienda).

Office Action dated Feb. 18. 2011, received in U.S. Appl. No. 11/620,642, 16 pages (Kocienda).

Notice of Allowance dated Oct. 24, 2011, received in U.S. Appl. No. 11/620,642, 9 pages (Kocienda).

Office Action dated Apr. 17, 2012, received in ROC (Taiwan) Patent Application No. 097100079, which corresponds to U.S. Appl. No. 11/620,642, 12 pages (Kocienda).

Office Action dated Nov. 21, 2011, received in U.S. Appl. No. 12/165,554, 18 pages (Kocienda).

Notice of Allowance dated Apr. 2, 2012, received in U.S. Appl. No. 12/165,554, 9 pages (Kocienda).

Office Action dated Jan. 5, 2012, received in U.S. Appl. No. 12/505,382, 36 pages (Westerman).

Final Office Action dated May 3, 2012, received in U.S. Appl. No.

(56) References Cited

OTHER PUBLICATIONS

12/505,382, 27 pages (Westerman).
Final Office Action dated Jul. 9, 2012, received in U.S. Appl. No. 12/505,382, 35 pages (Westerman).
Office Action dated Feb. 17, 2012, received in U.S. Appl. No. 12/727,219, 16 pages (Kocienda).
Office Action dated Dec. 7, 2012, received in U.S. Appl. No. 13/559,495, 10 pages (Kocienda).
Notice of Allowance dated Jun. 25, 2013, received in U.S. Appl. No. 13/559,495, 6 pages (Kocienda).
Notice of Allowance dated August 15, 2013, received in U.S. Appl. No. 13/559,495, 10 pages (Kocienda).
Office Action dated Nov. 20, 2009, received in U.S. Appl. No. 11/620,641, 22 pages (Christie).
Final Office Action dated Jun. 25, 2010, received in U.S. Appl. No. 11/620,641, 32 pages (Christie).
Office Action dated Apr. 1, 2010, received in Australian Patent Application No. 2007342164, which corresponds to U.S. Appl. No. 11/620,641.
Office Action dated Nov. 25, 2010, received in Chinese Patent Appilcation No. 200780052020.1, which corresponds to U.S. Appl. No. 11/620,641, 14 pages (Christie).
Office Action dated May 26, 2010, received in European Application No. 07 869 922.0, which corresponds to U.S. Appl. No. 11/620,641, 5 pages (Christie).
Office Action dated Dec. 7, 2010, received in European Patent Application No. 07 869 922.0, which corresponds to U.S. Appl. No. 11/620,641, 5 pages (Christie).
Office Action dated May 26, 2010, received in European Application No. 07 869 923.8, which corresponds to U.S. Appl. No. 11/620,642 4 pages (Kocienda).
Office Action dated Apr. 10, 2009, received in U.S. Appl. No. 11/549,624, 7 pages (Mansfield).
Office Action dated Jul. 22, 2009, received in U.S. Appl. No. 11/549,624, 9 pages (Mansfield).
Final Office Action dated Feb. 1, 2010, received in U.S. Appl. No. 11/549,624, 12 pages (Mansfield).
Notice of Allowance dated Jun. 3, 2010, received in U.S. Appl. No. 11/549,624, 6 pages (Mansfield).

* cited by examiner

TEXT CORRECTION PROCESSING

BACKGROUND OF THE INVENTION

User interfaces are provided to enable users to enter text or other content elements into application documents, such as a word processing document. In touch-interface smart phones and other touch interface devices, for example, a traditional "QWERTY" or other keyboard may be displayed via a touch-sensitive display, such as a capacitive display. User touches are processed initially to determine which key was most likely intended. The key to which a touch is mapped may then be displayed, for example in a text entry field in which the user is entering text, a document or other application object, etc.

In addition to mapping touches to keys, sequences of touches must be mapped to words and in some system auto-correction and/or auto-completion suggestions are identified, evaluated, and if appropriate suggested to the user as inline corrections/completions.

BRIEF DESCRIPTION OF THE DRAWINGS

Various embodiments of the invention are disclosed in the following detailed description and the accompanying drawings.

DETAILED DESCRIPTION

Figure 1:
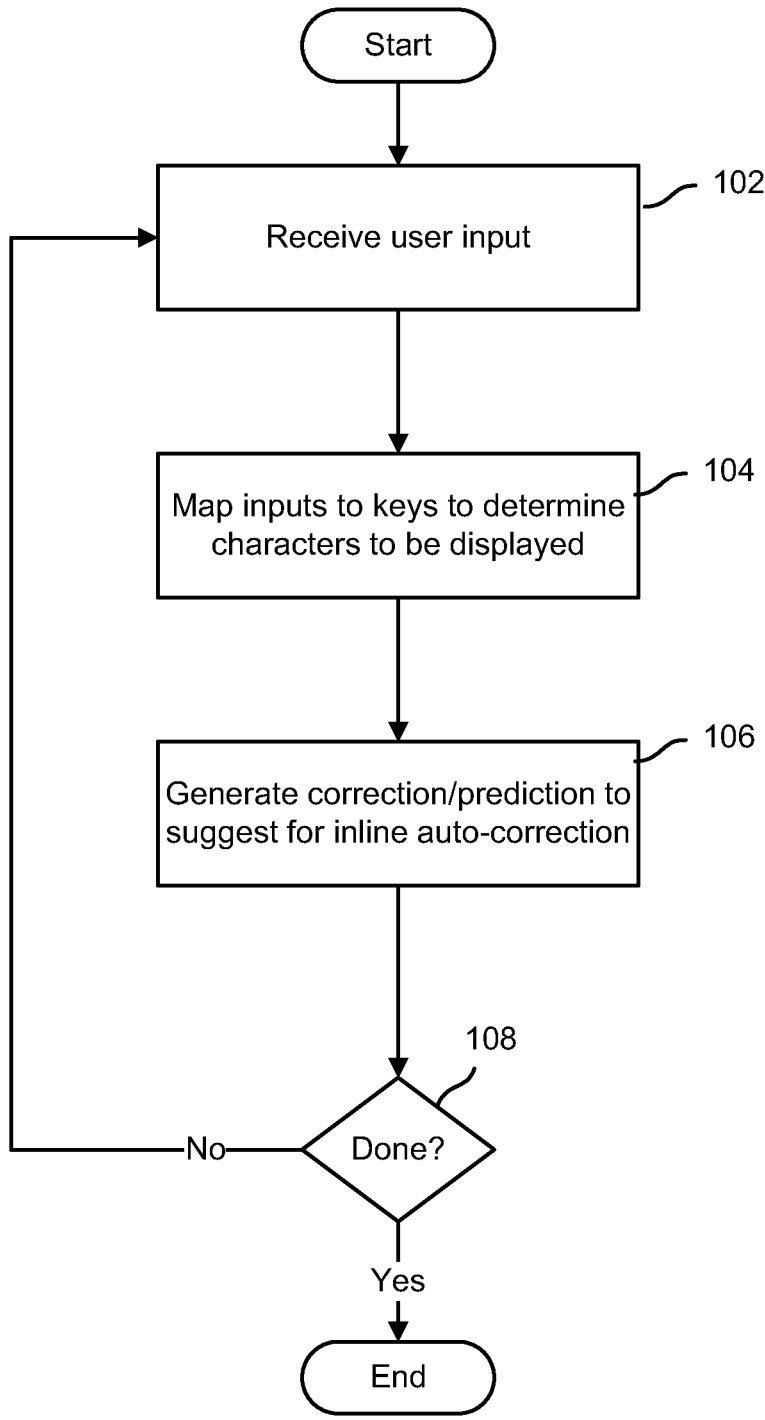
FIG. 1 is a flow chart illustrating an embodiment of a process to receive user input and display associated text.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Processing of user input, such as user touches on a keyboard interface displayed in a touch-sensitive display device, is disclosed. As touches to the interface are received, each touch is mapped to one or more candidate keys associated with the touch, for example, one or more keys displayed nearest the touch. Each touch is mapped to a key selected to be displayed in the document or other text entry area being displayed to the user. In addition, sequences of touches are evaluated to determine auto-correction and/or auto-completion suggestions, if any, to be displayed to the user as "inline" corrections, shown for example in a bubble or otherwise adjacent and/or near the sequence currently displayed, i.e., to sequence of keys to which a current sequence of touches have been mapped. In various embodiments, keyboard geometry and/or language models are used to map touches to keys and/or to generate auto-correction and/or auto-completion candidates.

In some embodiments, a set of candidate key sequences are updated as subsequent touches are received. An initial score is assigned to each of a plurality of candidate sequences each of which incorporates a candidate key that has been identified as a candidate with which a touch or other received user input is associated. In some embodiments, the initial score is based at least in part on a keyboard geometry-based value associated with the received user input with respect to the candidate key, for example, an error vector from a touch to the location at which the key was displayed. At least initially, only a subset of candidate sequences so derived are further evaluated to determine for each candidate sequence in the subset a refined score. The initial score of each candidate sequence is configured to comprise an upper bound of a refined score for that sequence, such that if the refined score of a candidate sequence in the subset is higher than the initial score of one or more candidate sequences not in the subset, the candidate sequence with the refined score may be included in a starting set of candidates for a next iteration (for example, processing a subsequent touch) without first determining a refined score for such candidate sequences not in the subset. In this way, further processing to determine refined scores for candidates not in the subset may be delayed and possibly avoided, for example if the starting set is filled with a prescribed number of members before such further processing is performed.

In some embodiments, unigram (e.g., one word at a time) analysis is extended to detect and correct automatically errors by which a user who intended to select a "space" key to insert a space between words enters a touch or other input that instead gets mapped at least initially to another key, such as a key adjacent to the space key as displayed. In various embodiments, a unigram model provides the probability of a given key (character) given a preceding sequence of zero or more characters. In some embodiments, a candidate sequence is evaluated based at least in part on the respective probability of each key in the candidate sequence occurring after the sequence that precedes that key in the sequence. In some embodiments, the probabilities are expressed as values between zero and one and the respective probabilities are multiplied together to determine a probability for the sequence. In various embodiments, the unigram approach is extended to include the possibility that a "space" key, as opposed to a letter, was intended to be entered. In some embodiments, the probability associated with the space key is equal to and/or determined at least in part based on a probability of a key immediately following the space in the candidate sequence occurring at the beginning of a word.

FIG. 1 is a flow chart illustrating an embodiment of a process to receive user input and display associated text. In the example shown, a user input, such as a user touch on a touch-sensitive display or user input provided via another user input device, is received (102). The input (i.e., touch) is mapped to a corresponding character to be displayed at least initially (104). The sequence of touches and/or keys (characters) to which touches have (at least initially or tentatively) been mapped is evaluated to identify an auto-correction and/or auto-completion suggestion, if any, to be provided (for example, displayed adjacent to the sequence of characters that is currently displayed based on the sequence of touches) (106). The process repeats with each subsequent touch or other input, if any, until done (108).

Figure 2A:
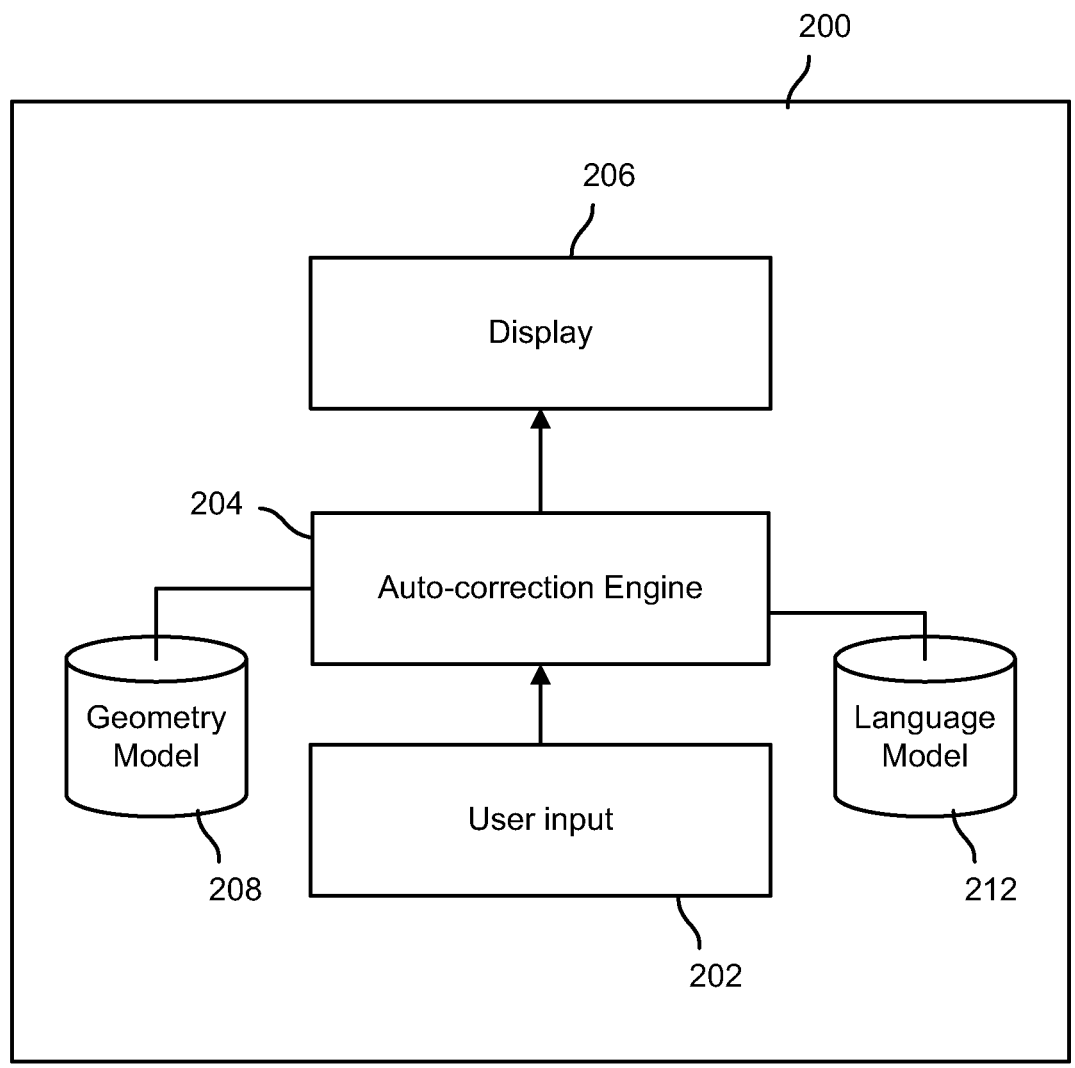
FIG. 2A is a block diagram illustrating an embodiment of a system configured to receive and process user input.

FIG. 2A is a block diagram illustrating an embodiment of a system configured to receive and process user input. In the example shown, the system 200 includes a user input interface 202, an auto-correction engine 204, and a display component 206. Examples of the system 200 include, without limitation, a personal, laptop, tablet, or other portable computer, a smart phone, personal data assistant device, etc. In some embodiments, user input interface 202 comprises a processing module, such as software running on a processor (not shown) comprising system 200, configured to receive and process user "touches" or other inputs entered via a "soft" keyboard or other interface displayed on a touch-sensitive display device associated with display component 206. As touches (or other inputs) are received, user input interface 202 provides associated data, such as touch coordinates, to auto-correction engine 204. Auto-correction engine 204 in various embodiments comprises a functional module provided by software executing on a processor comprising system 200. Auto-correction engine 204 is configured, in various embodiments, to use one or more of a geometry model 208 and a language model 212 to determine based on a received sequence of one or more touches a corresponding sequence of one or more characters to display via a display device associated with display component 206. In various embodiments, auto-correction engine 204 is configured to use one or more of a geometry model 208 and a language model 212 to determine based on a received sequence of one or more touches and/or a corresponding sequence of one or more characters to which the sequence of touches has been mapped an auto-correction and/or auto-completion suggestion to be provided, for example by displaying the suggestion as "inline" or other adjacent text via a display device associated with display component 206. In various embodiments, auto-correction engine 204 is configured to implement "lazy" evaluation of candidate key sequences and/or to extend unigram model processing for received text input to include candidate sequences that include a "space" key, as disclosed herein.

Figure 2B:
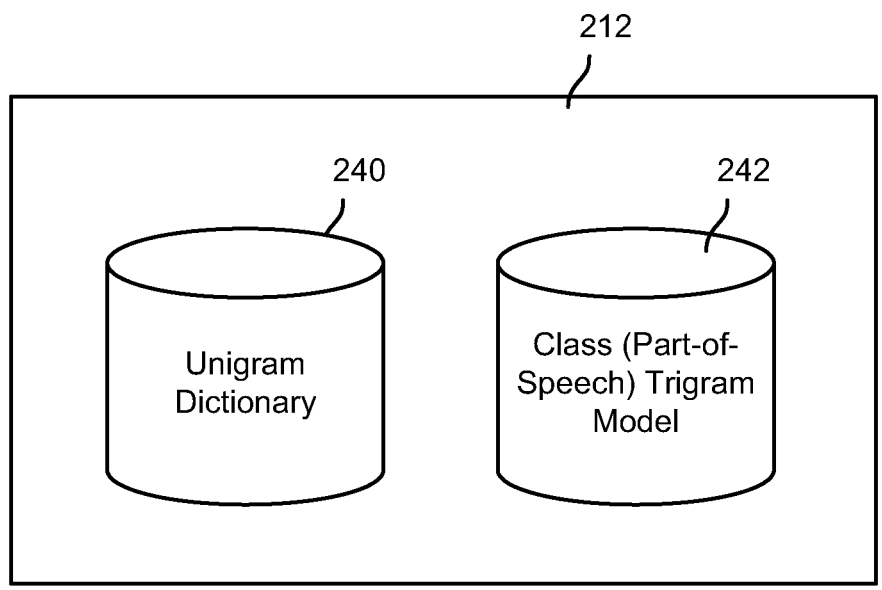
FIG. 2B is a block diagram illustrating an embodiment of a language model.

FIG. 2B is a block diagram illustrating an embodiment of a language model. In the example shown, language model 212 of FIG. 2A includes a unigram dictionary 240 and a class (part-of-speech) trigram model 242. Unigram dictionary provides for a given candidate key to which to map an input, given one or more prior keys in the sequence, a probability that the candidate key would have been intended. Class (POS) trigram model 242 in various embodiments provides probabilities that a candidate word was intended to be entered given the preceding two words and the respective parts of speech of the three words.

"Lazy" Evaluation of Candidate Key Sequences

Figure 3:
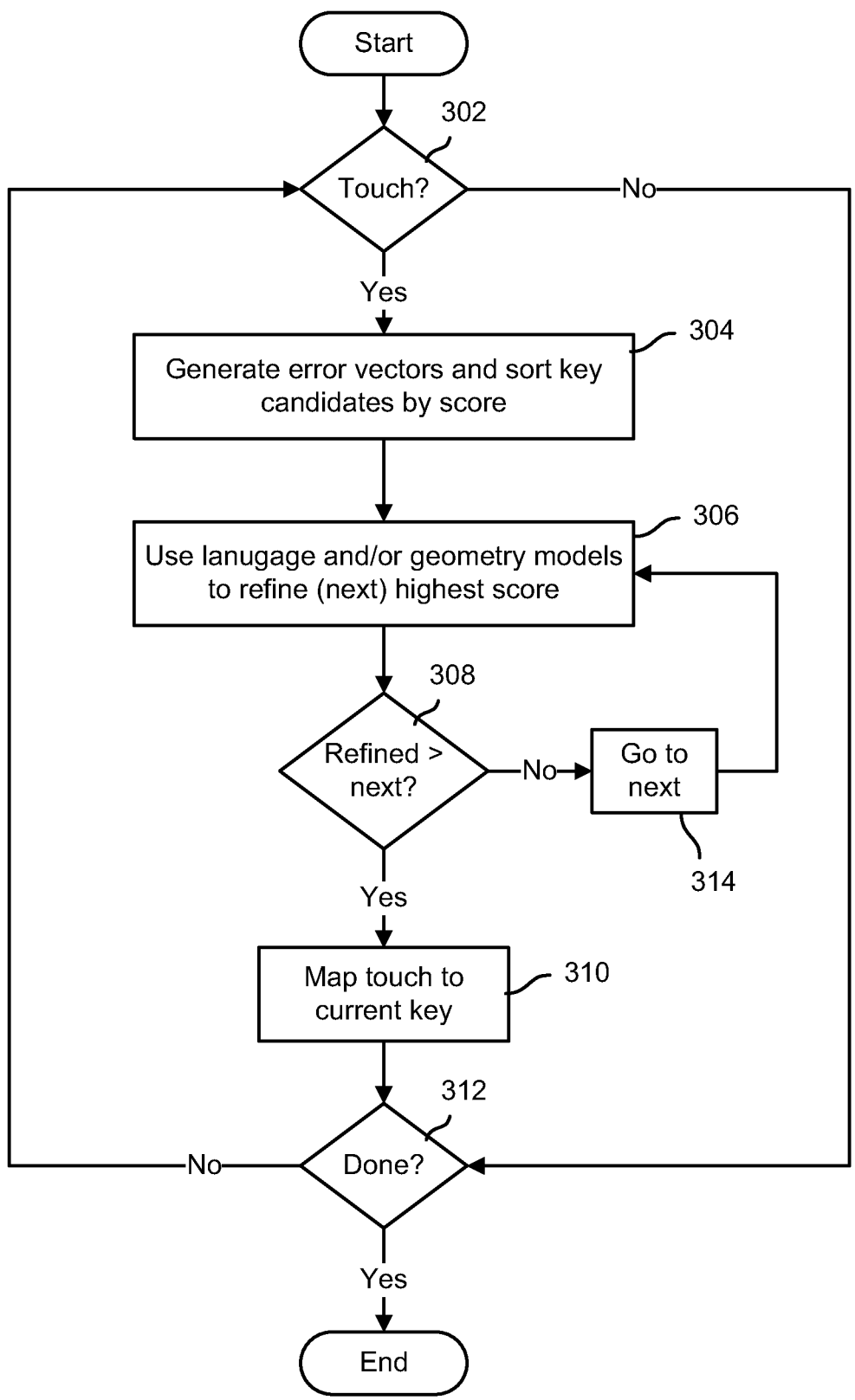
FIG. 3 is a flow diagram illustrating an embodiment of a process to receive and process user input.

FIG. 3 is a flow diagram illustrating an embodiment of a process to receive and process user input. In the example shown, when a "touch" or other input is received (302), keyboard (or other interface) geometry-based error vectors are generated, probabilities and/or other scores derived therefrom are determined, and if more than one key is a candidate to be mapped to the touch the candidates are sorted by their respective scores (304). For example, based on the x-y coordinates of a received touch relative to the respective positions at which the soft keys "E" and "R" are displayed, such as the respective linear distance from the touch to each respective candidate key, a probability $P_E$ may be associated with the candidate key "E" and a probability $P_R$ associated with the candidate key "R". Language, geometry, and other models are used in this example to refine the score of a key candidate currently having the highest (or next highest, in any iteration subsequent to the first) score among the candidates (306). At least initially, in various embodiments the score(s) of one or more other candidates is/are not refined. Examples of using a language model to compute a refined score include, without limitation, adjusting a score associated with a candidate key based at least in part on a language model-determined probability of a string that would result from the touch being mapped to that candidate key, and/or a word comprising that string, occurring in a document or other text in a language with which the text input is associated. For example the probability of a touch being mapped to the key "R" may be reduced if preceding touches have been mapped to the keys T-H-E-R and based on a language model it is determined that the sequence T-H-E-R-R has a relatively low probability of occurring; whereas a language-model refined score for a candidate key "E" in the same context may be determined to have a relatively higher probability, based on a higher likelihood of the sequence T-H-E-R-E occurring.

In some embodiments, initial scores are scaled to fall within a range from zero to one. The respective initial score for each candidate key is considered to comprise an upper bound score for that key. Refined scores are determined by multiplying the initial score by further probabilities that likewise have been scaled to values between zero and one, such as probabilities determined by considering information other than the touch or other input currently being evaluated, such as preceding touches and/or words entered and/or determined to have been entered by the user, including without limitation language model-derived probabilities as described above. As a result of such an approach, if the refine score of candidate A is greater than the initial, unrefined score of candidate B, it can be concluded that the refined score of candidate A will (or would) be greater than the refined score of candidate B, if it were computed, since the refine score of candidate B would always be equal to or less than the initial score of candidate B. In various embodiments, this observation and approach is used to perform further processing of key candidates and/or associated candidate key sequences only "lazily", and to avoid performing such further processing with respect to candidates that can with confidence be excluded without performing such further processing to determine for such candidates a refined score.

In the example shown in FIG. 3, for example, if the refined score determined for the key candidate currently being considered is greater than the next highest score in the set of candidates, if any (308), the touch is mapped to the candidate key with which the refined score is associated (310). Otherwise, processing proceeds to consideration of the candidate key that has the highest score (i.e., now that the score refined at 306 has been refined, in this case to a score lower than the score that is now highest) (314). The initial and currently highest score is then refined (306) and compared to other scores in the set (308), and if the refined score is the highest the touch is mapped to the current key (310), otherwise processing continues based on the currently highest score among the candidates until a refined score that is higher than the score of any other key candidate is found, after which the process ends (312).

Figure 4:
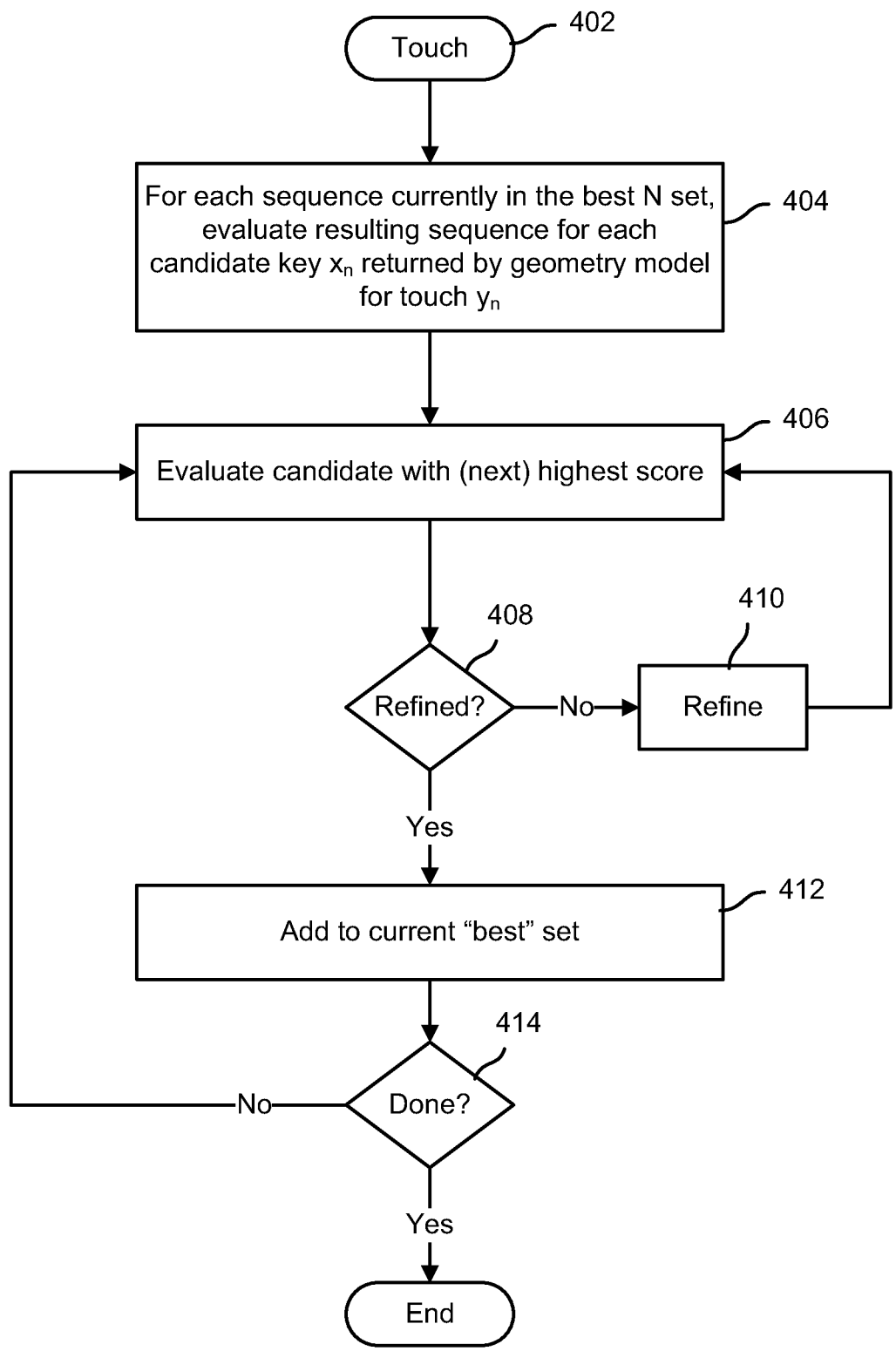
FIG. 4 is a flow diagram illustrating an embodiment of a process to receive and process user input.

FIG. 4 is a flow diagram illustrating an embodiment of a process to receive and process user input. In the example shown, when a touch $y_n$ or other input is received (402), for each candidate sequence currently in a best N set of candidates, each resulting sequence obtained by extending the candidate sequence by each candidate key $x_n$ that has been identified as a candidate key to which the touch $y_n$ may be mapped, based on an error vector and/or other geometry based information for example, is evaluated for inclusion in an updated best N set of candidates (404). For example, if N=3 and two possibilities have been identified for a next touch $y_n$, then six possible sequences are evaluated, starting with a candidate sequence having a highest score among the candidates in the best N set of candidate sequences from the previous iteration, after such scores have been updated to reflect probabilities associated with the respective key candidates (406). If the score is a refined score (note that in this example no score would be refined in the very first iteration) (408), then the candidate sequence currently being considered is added to the updated best N set (412). If the high score is not a refined score, further processing, such as language model based processing, is performed to refine the score (410), after which the candidate sequence having the highest score (after refinement of the score just refined) is evaluated (406). As in the above-described iteration, if the high score is refined score (408), for example because the score just refined remains higher than any other score in the set of extended candidate sequences, then the candidate sequence with which the refined score is associated is added to the set (412), and so on. Processing continues until N candidate sequences have been added to the new/updated best N set of candidate sequences (414), after which the process of FIG. 4 ends. In this way, scores are refined in successive iterations as and only to an extent required to identify the best (most probable) N candidate sequences to be carried forward for consideration based on a next touch, if any. Candidate sequences whose initial, unrefined scores are lower than the refined score of N other candidate sequences, if any, are excluded without further processing ever being performed to refine their respective scores.

Figure 5:
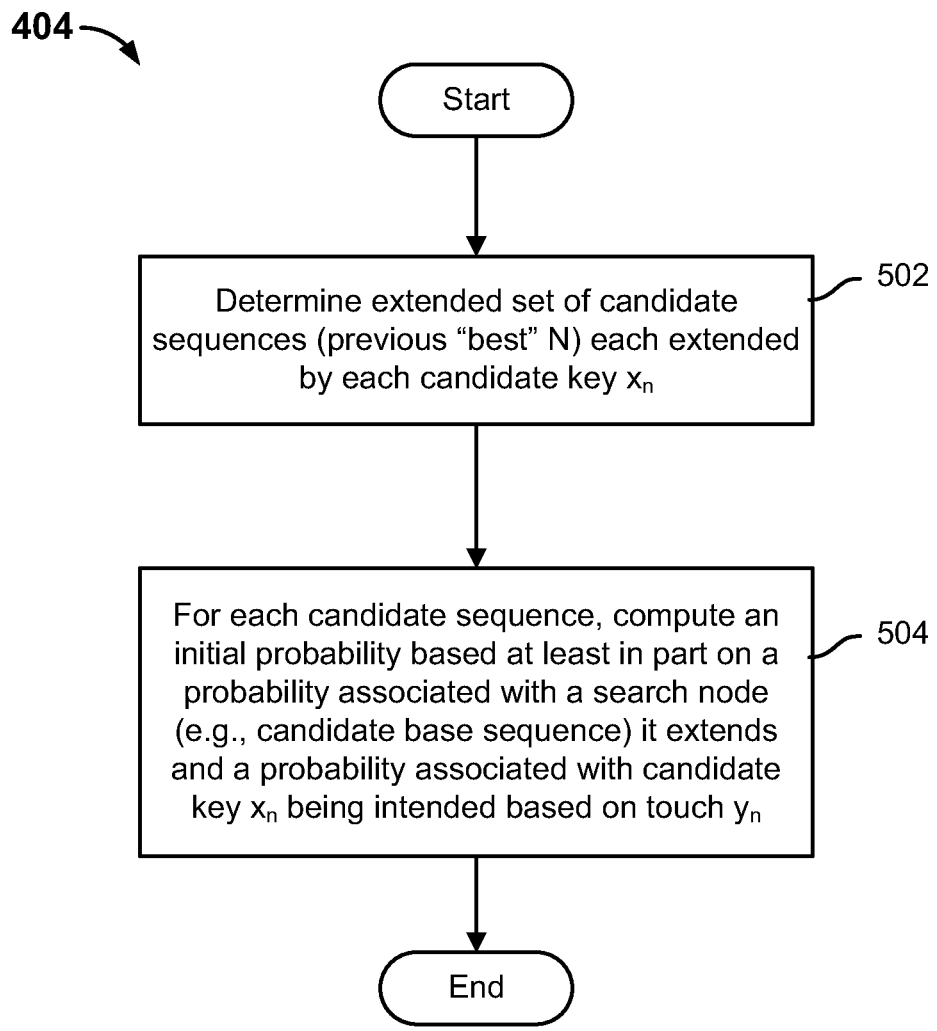
FIG. 5 is a flow diagram illustrating an embodiment of a process to determine an extended set of candidate sequence search nodes.

FIG. 5 is a flow diagram illustrating an embodiment of a process to determine an extended set of candidate sequence search nodes. In some embodiments, the process of FIG. 5 is used to implement 404 of FIG. 4. In the example shown, a set of extended candidate sequences is formed by appending to each member of a previous (i.e., current, not yet updated) set of best N candidate sequences each candidate key $x_n$ associated with a touch $y_n$ (502). For each candidate sequence in the resulting set of extended candidate sequences, an initial updated probability (and/or other score) is computed (504) based at least in part on (1) a probability associated with a candidate sequence that was extended to form the extended candidate sequence, for example a probability (such as a refined score as described above) determined for the candidate sequence in a prior iteration based on a preceding touch, and (2) a probability associated with the candidate key $x_n$ for example an error vector or other value indicative of the likelihood that the candidate key $x_n$ was intended by the touch $y_n$. In some embodiments, the previously computed probability or other score is multiplied by the error vector-based probability or other score associated with the candidate key $x_n$ to determine the initial probability for the extended candidate sequence.

Figure 6:
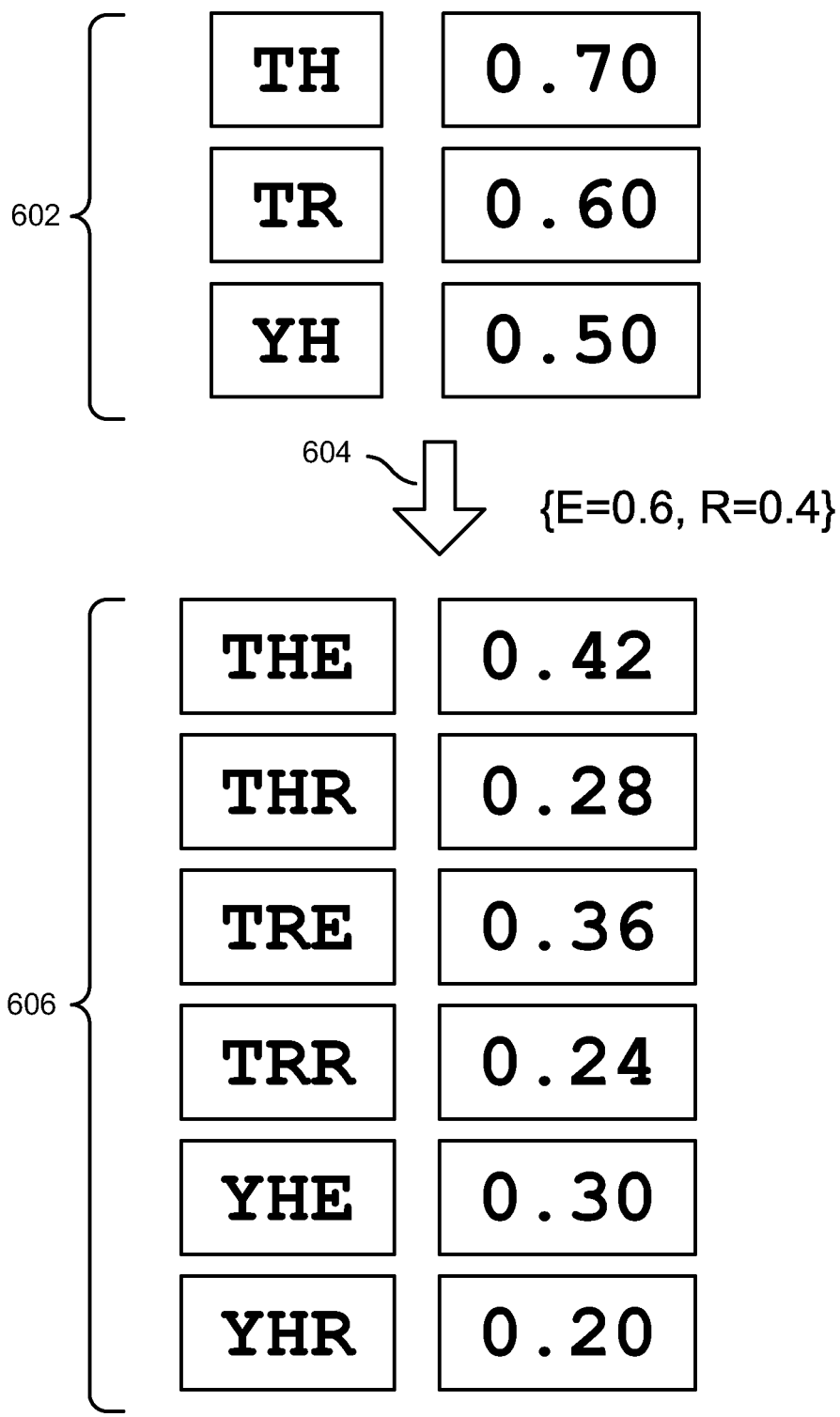
FIG. 6 is a diagram illustrating an example of forming and computing initial probability based scores for a set of extended candidate sequences in various embodiments.

FIG. 6 is a diagram illustrating an example of forming and computing initial probability based scores for a set of extended candidate sequences in various embodiments. In the example shown, a current set 602 comprising the three best candidate sequences determined in a prior iteration is shown. The set includes three candidate sequences (T-H, T-R, and Y-H), each have a corresponding score shown to the right of the sequence. In the example shown, a subsequent touch has been associated with two key candidates, a first candidate "E" having an initial score of 0.6 associated with it, and a second candidate "R" having an initial score of 0.4 associated with it. In some embodiments, the scores for candidate keys are based at least in part on geometry, such as error vectors. Arrow 604 indicates the process by which each candidate sequence in set 602 is extended by each of the two candidate keys to yield the resulting extended set 606. For each extended sequence in set 606, a corresponding score is computed, in this example by multiplying the score shown in set 602 for the two-character sequence extended to form the extended sequence in 606 by the score associated with the candidate key used to extend the sequence. For example, the sequence T-H-E is shown as having an initial score of 0.42 computed by multiplying the score associated previously with sequence T-H (0.70) by the score associated with candidate key E (0.60), i.e., 0.70×0.60=0.42.

In various embodiments, the respective initial scores shown in FIG. 6 for extended sequences are evaluated lazily, for example as described above in connection with FIG. 4, to populate a new/update set of the best three candidates from the set 606 of extended sequences. For example, as shown in FIG. 6 the sequence T-H-E has the highest initial score. In some embodiments, further processing would be performed first with respect to the sequence 0.42. If the resulting refined score remained higher than any other score in the set, refined or not, then the sequence T-H-E would be added to the new "best three" set. If instead another, unrefined score were higher, that other score would be refined and then checked to see if it remained the highest. Successive iterations would be performed until three (in this example) sequences had been added to the new/update set of best candidate sequences to carry forward to use in processing the next touch.

In some embodiments, once one or more auto-correction and/or auto-completion candidate words have been determined, further processing is performed to refine auto-correction candidate scores based on contextual information, such as one or more words preceding a current sequence being evaluated. For example, as words are identified as having been entered by the user in some embodiments part-of-speech tagging and/or other language model based processing is performed to generate contextual information that is used to evaluate one or more auto-correction and/or completion candidates associated with a sequence currently being evaluated. For example, if a definite article followed by a noun has been typed and tagged, in some embodiments an auto-correction candidate that is a verb may be considered more likely than a second candidate that is not a verb. The term "n-gram" is used to refer to text processing in which decisions are made based at least in part on a context comprising a set of n words that include and/or otherwise provide context for the text being processed.

Figure 7:
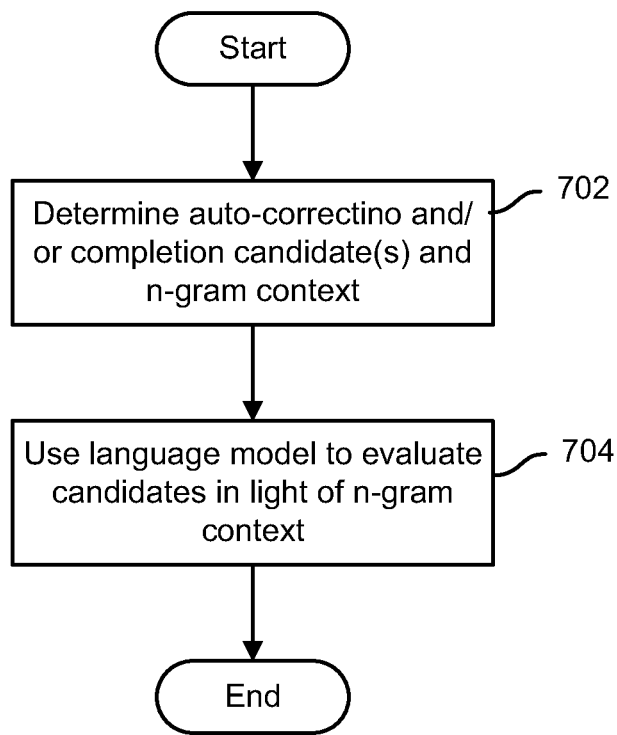
FIG. 7 is a flow diagram illustrating an embodiment of a process to map user inputs to keys.

FIG. 7 is a flow diagram illustrating an embodiment of a process to map user inputs to keys. In the example shown, auto-correction candidates associated with a sequence of touches or other inputs, along with a set of preceding and words comprising an n-gram context for the sequence currently being evaluated, are received (702). Language model-based techniques are used to evaluated the key candidates at least in part by considering the n-gram context information (704), for example as described above.

Extending Unigram Analysis to Incorporate the "Space" Key

In various embodiments, unigram analysis is extended to incorporate consideration of the "space" bar or other key, for example, in order to detect and suggest auto-correction of errors by which a user who intended to enter a space instead made an input (e.g., soft keyboard touch) that was mapped to a key adjacent to the space key, such as a "v", "b", or "n" in a keyboard using the familiar QWERTY layout.

Figure 8A:
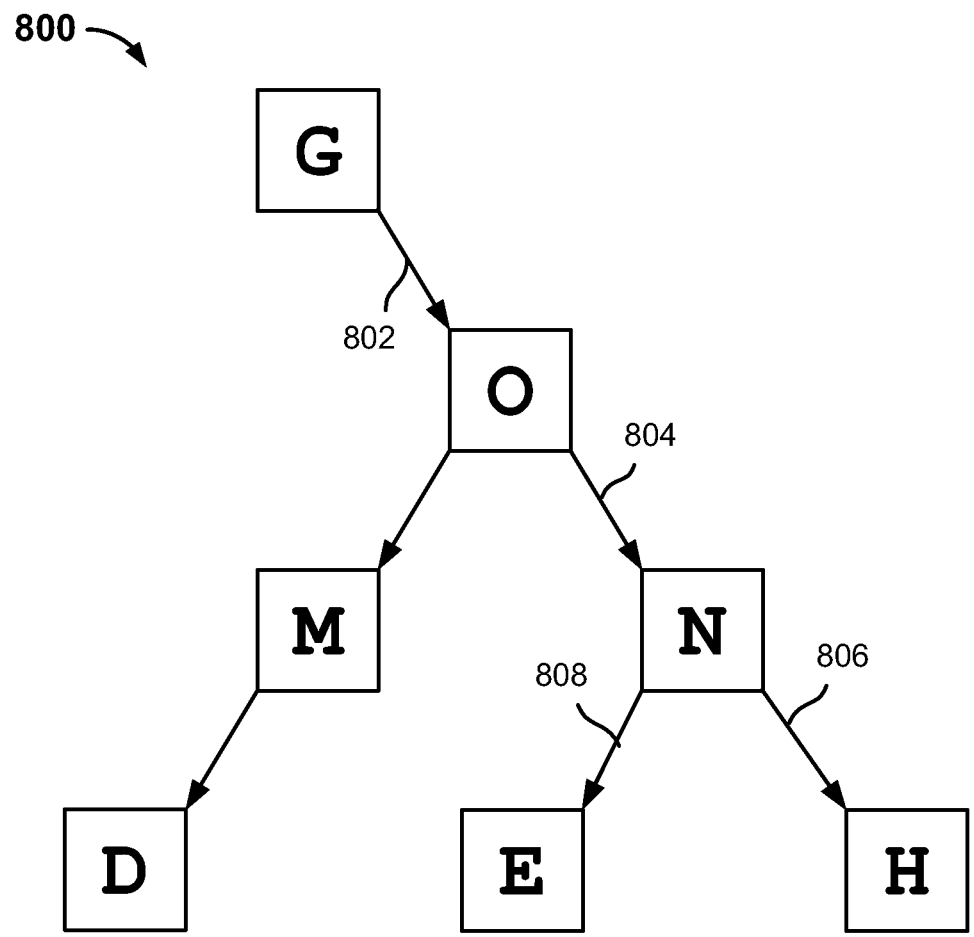
FIG. 8A is a block diagram illustrating an embodiment of a system configured to perform unigram analysis.

FIG. 8A is a block diagram illustrating an embodiment of a system configured to perform unigram analysis. In the example shown, a tree representation 800 of a unigram model is shown. The model provides for each candidate keys in a candidate sequence an incremental probability of that key occurring after the key preceding it in the candidate sequence. In the example shown, for example, the model would provide for a candidate sequence G-O-N a first probability of the character "G" occurring at the beginning of a word, a second probability of an "O" occurring after a "G" (represented by arrow 802), and a third probability of an "N" occurring after an "O" (represented by arrow 804). The three probabilities would be used, in various implementations, to determine and/or adjust a probability or other score for the candidate sequence G-O-N, for example, by multiplying the first, second, and third probabilities together.

In prior approaches, a unigram model and analysis typically would be used to evaluate a sequence believed to comprise a single word or portion thereof. For example, on detection of the end of a word, for example detecting entry of a space and/or end of sentence punctuation, in prior approaches a unigram model such as the one represented in FIG. 8A might be used to identify and/or evaluate candidates for auto-correction. In the example shown in FIG. 8A, for example, the detected sequence G-O-N-H might be determined based on the model to be significantly less likely to have been intended than the sequence G-O-N-E, at least in part due to the relatively lower probability (see 806) of an "H" occurring after an "N", rather than an "E" (808).

Extending a unigram model and analysis to detect errors resulting in a key other than the "space" key being mapped to a touch or other user input when the user in fact intended to type a space is disclosed.

Figure 8B:
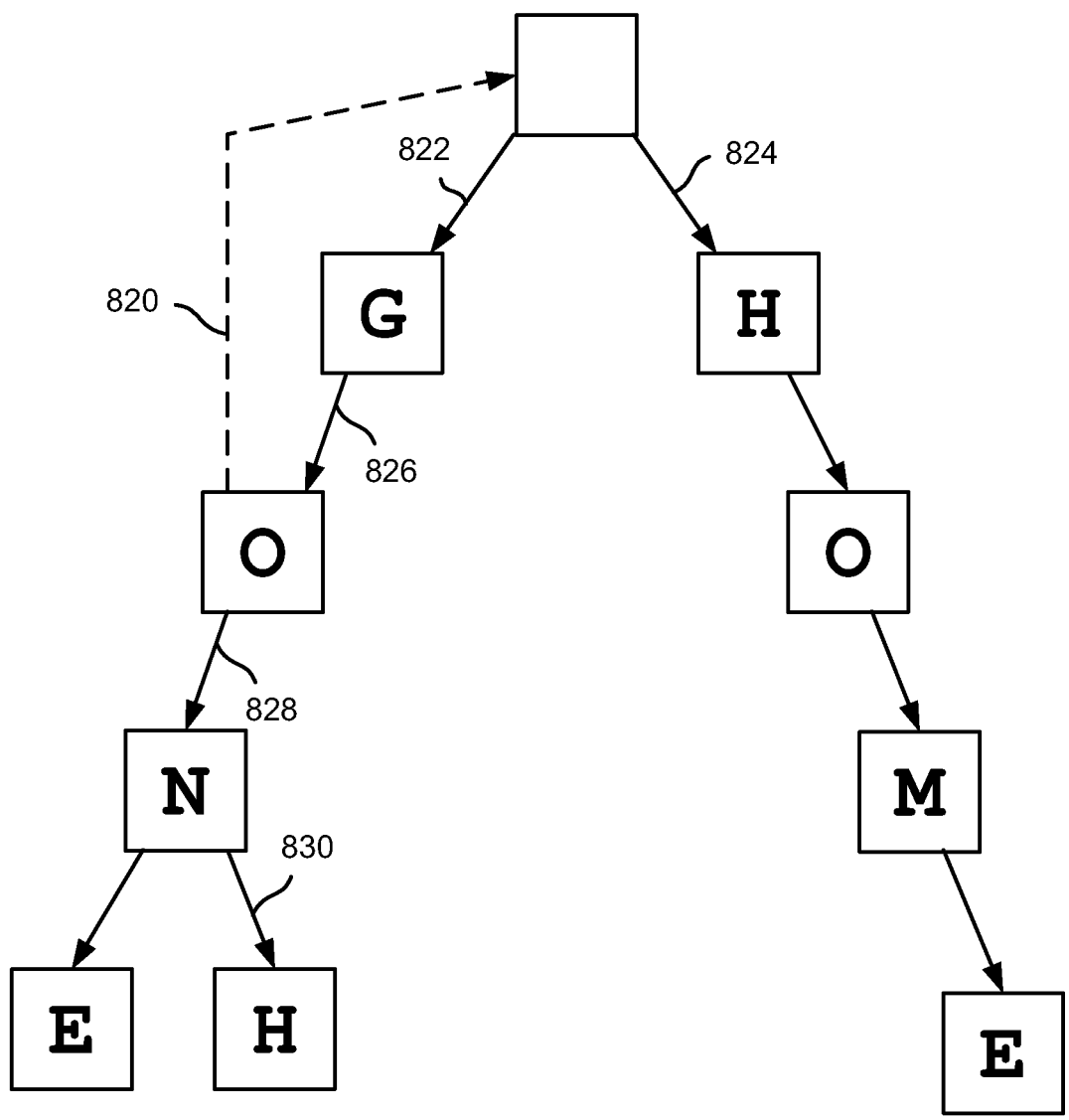
FIG. 8B is a block diagram illustrating an embodiment of a system configured to extend unigram analysis to detect "space" key entry errors.

FIG. 8B is a block diagram illustrating an embodiment of a system configured to extend unigram analysis to detect "space" key entry errors. In the example shown, a unigram model such as the one shown in FIG. 8A has been extended to include a transition 820 back to the top level of the model. In some embodiments, at the top level of the model the probability of a character occurring at the start of a word are provided for each character (e.g., letter), for example 822, 824. In some embodiments, a candidate sequence of keys may include a "space" key. The candidate sequence including the "space" is processed as a unigram. In various embodiments, the likelihood that a particular touch will be mapped to the "space" key, as opposed to an adjacent key (result, for example, in a space being displayed to the user as having been typed) is determined at least in part by associating with the "space" key in the unigram analysis a probability associated with a transition such as transition 820 back to the top level of the unigram model. In some embodiments, the probability associated with a transition back to the top level, such as 820, is determined to be the same as a probability of a next key following the space key in the candidate sequence occurring at the beginning of a word (e.g., 822, 824). For example, in evaluating the candidate sequences "GONHOME" and "GO HOME", the likelihood that the first sequence was intended would be determined in part by the probability 822 of "G" occurring at the start of a word and the respective probabilities associated with the transitions 826, 828, and 830, respectively; while the likelihood of the third touch instead being mapped to a "space" would be determined in various embodiments by the probability 822 of a "G" occurring at the start of a word, and the probabilities associated with the transitions 826 and 820. In some embodiments, as noted above, the probability associated with transition 820 would be determined in this example at least in part based on the likelihood 824 of a character (here "H") following the "space" in the candidate sequence occurring at the start of a word.

Figure 9:
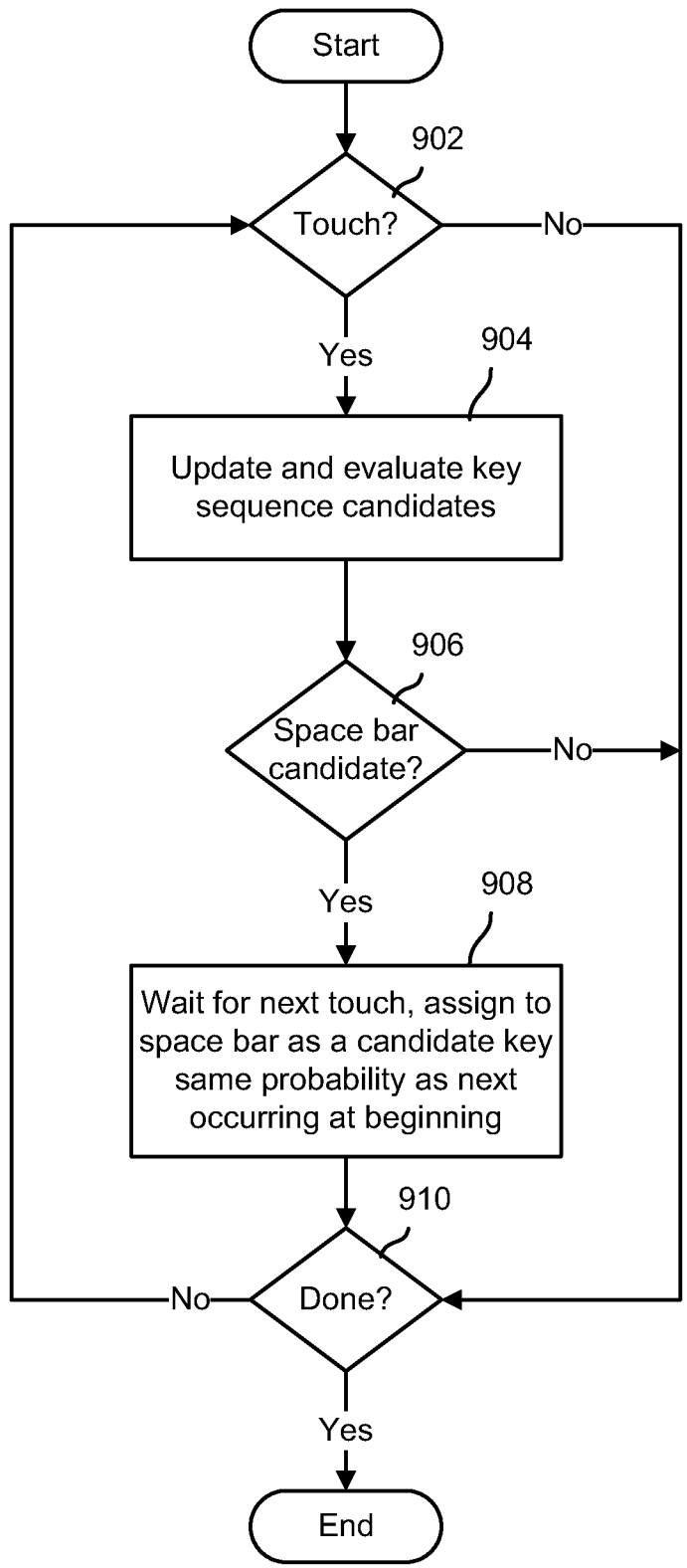
FIG. 9 is a flow diagram illustrating an embodiment of a process to detect "space" key entry errors.

FIG. 9 is a flow diagram illustrating an embodiment of a process to detect "space" key entry errors. In the example shown, when a touch is received (902) candidate key sequences are updated and evaluated (904). If a candidate sequence includes a "space" key (906), a probability is assigned to the "space" key as a candidate at least in part by waiting for a subsequent touch $y_{n+1}$ to be mapped to an associated key $x_{n+1}$ and associating with the "space" key as a candidate key $x_n$ to which to map an associated touch $y_n$ a probability associated with the following candidate key $x_{n+1}$ occurring at the beginning of a word (908). Processing continues until done (910), for example it is determined that a complete and correct word has been entered and displayed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing user input, comprising:
assigning to each of a plurality of candidate sequences of one or more characters, each associated with a candidate key which has been identified as a candidate with which a received user input is associated, an initial score based at least in part on a keyboard geometry-based value associated with the received user input with respect to the candidate key;
performing further processing with respect to a subset of the candidate sequences having the highest initial score (s), without at least initially performing the same further processing with respect to one or more other candidate sequences not in the subset, to determine for each candidate sequence in the subset a refined score; and
selecting a candidate sequence for inclusion in a result set based at least in part on a determination that a refined score of the selected candidate is higher than an initial score of one or more candidate sequences that are not included in the subset and with respect to which the further processing has not been performed.

2. The method of claim 1, wherein the received user inputs comprise touches on a touch-sensitive display or other input device.

3. The method of claim 1, wherein the keyboard geometry-based value comprises an error vector representing a detected location of the user input relative to a location at which a user interface image associated with the candidate key is displayed.

4. The method of claim 1, wherein the further processing includes using a language model to determine the refined score.

5. The method of claim 4, wherein the language model is used to determine a probability of occurrence of the candidate sequence in a language with which the user input is associated.

6. The method of claim 1, wherein result set comprises a set of N candidate sequences to be carried forward into a next iteration of processing.

7. The method of claim 6, wherein the result set comprises a starting set of candidate sequences to be used to evaluate a next user input.

8. The method of claim 6, wherein the steps of performing further processing and selecting are repeated until N candidate sequences have been added to the result set.

9. The method of claim 8, wherein an iteration of the method of claim 1 ends without further processing being performed on any further candidate sequences in the plurality of candidate sequences once N candidate sequences have been added to the result set.

10. The method of claim 1, wherein the further processing includes using a language model and an n-gram context data associated with the candidate sequence to determine the refined score.

11. The method of claim 10, wherein the n-gram context data comprises two words preceding the candidate sequence.

12. The method of claim 1, wherein the further processing includes using a language model and an n-gram context data associated with the candidate sequence to determine at least in part whether the received user input should be mapped to the candidate key.

13. A system configured to process text input, comprising:
   an input device configured to receive a sequence of user inputs; and
   a processor coupled to the input device and configured to:
      assign to each of a plurality of candidate sequences of one or more characters, each associated with a candidate key which has been identified as a candidate with which a received user input is associated, an initial score based at least in part on a keyboard geometry-based value associated with the received user input with respect to the candidate key;
      perform further processing with respect to a subset of the candidate sequences having the highest initial score(s), without at least initially performing the same further processing with respect to one or more other candidate sequences not in the subset, to determine for each candidate sequence in the subset a refined score; and
      select a candidate sequence for inclusion in a result set based at least in part on a determination that a refined score of the selected candidate is higher than an initial score of one or more candidate sequences that are not included in the subset and with respect to which the further processing has not been performed.

14. The system of claim 13, wherein the input device comprises a touch-sensitive device.

15. The system of claim 13, wherein the input device comprises a touch-sensitive display device and the processor is configured to display on the display device, for each received user input, a selected character to which the input has been mapped.

16. The system of claim 13, wherein the processor is further configured to generate, based at least in part on the result set, an auto-correction/completion candidate.

17. The system of claim 16, wherein the processor is further configured to display a selected auto-correction/completion candidate.

18. The system of claim 13, wherein the further processing includes using a language model to determine the refined score; and wherein the system further includes a storage device configured to store the language model.

19. A non-transitory computer program product for processing user input, the computer program product being embodied in a computer readable storage medium and comprising computer instructions for:
   assigning to each of a plurality of candidate sequences of one or more characters, each associated with a candidate key which has been identified as a candidate with which a received user input is associated, an initial score based at least in part on a keyboard geometry-based value associated with the received user input with respect to the candidate key;
   performing further processing with respect to a subset of the candidate sequences having the highest initial score(s), without at least initially performing the same further processing with respect to one or more other candidate sequences not in the subset, to determine for each candidate sequence in the subset a refined score; and
   selecting a candidate sequence for inclusion in a result set based at least in part on a determination that a refined score of the selected candidate is higher than an initial score of one or more candidate sequences that are not included in the subset and with respect to which the further processing has not been performed.

20. A method of processing user input, comprising:
   determining based on a received sequence of user inputs a set of candidate key sequences, the set including a candidate key sequences that includes a space key; and
   assigning to the candidate key sequence that includes the space key a candidate sequence score determined at least in part by associating with the space key a score component determined based at least in part on a probability associated with a subsequent key that follows the space key in the candidate sequence occurring at the beginning of a word.

21. The method of claim 20, wherein the set of candidate key sequences includes one or more candidate keys.

22. The method of claim 20, further comprising determining based at least in part on the candidate sequence score that a user input associated with the space key in the candidate sequence is to be mapped to the space key.

23. The method of claim 22, further comprising displaying a space in a display location associated with the space key in the candidate sequence based at least in part on the determination.

24. A system configured to process user inputs, comprising:
   an input device configured to receive a sequence of user inputs; and
   a processor coupled to the input device and configured to:

determine based on a received sequence of user inputs a set of candidate key sequences, the set including a candidate key sequences that includes a space key; and assign to the candidate key sequence that includes the space key a candidate sequence score determined at least in part by associating with the space key a score component determined based at least in part on a probability associated with a subsequent key that follows the space key in the candidate sequence occurring at the beginning of a word.

25. The system of claim 24, wherein the processor is further configured to determine based at least in part on the candidate sequence score that a user input associated with the space key in the candidate sequence is to be mapped to the space key; and to display, on a display device comprising the system, a space in a display location associated with the space key in the candidate sequence based at least in part on the determination.

* * * * *